Figure 1:
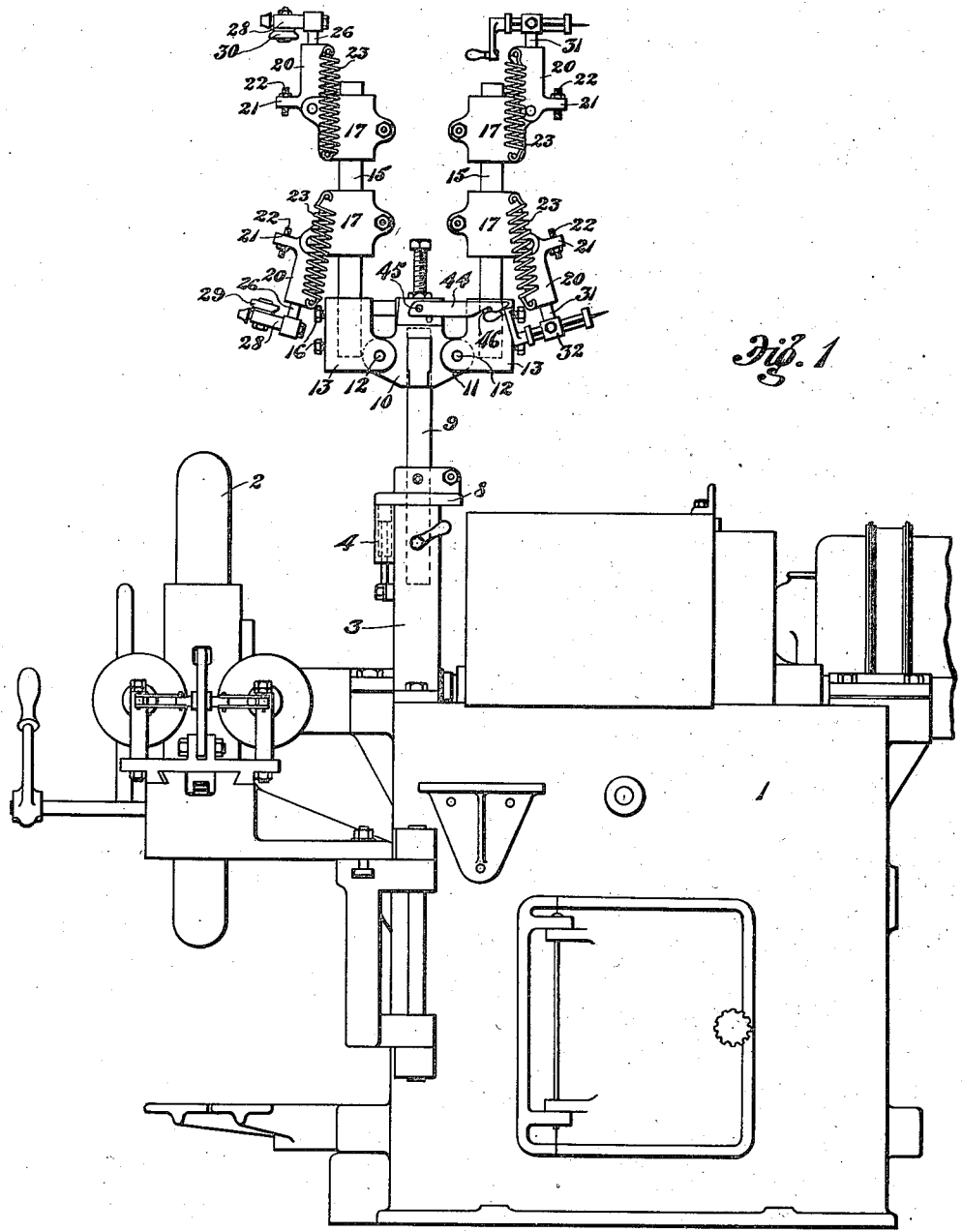

Feb. 3, 1925.

F. H. GROVE

TIRE MAKING MACHINE

Filed March 13, 1922

1,524,861

3 Sheets-Sheet 1

Inventor

Frank H. Grove

By Fream and Bond

Attorneys

Feb. 3. 1925.                                                                  1,524,861
F. H. GROVE
TIRE MAKING MACHINE
Filed March 13, 1922                        3 Sheets—Sheet 2
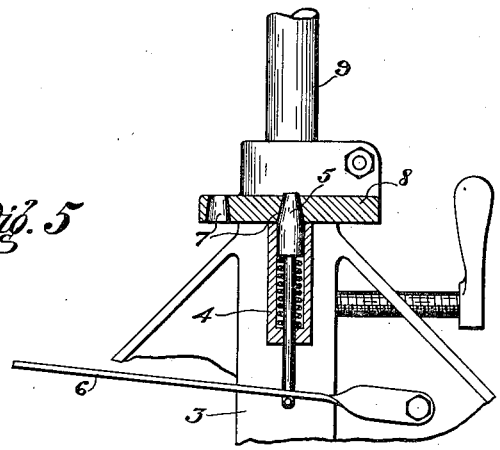
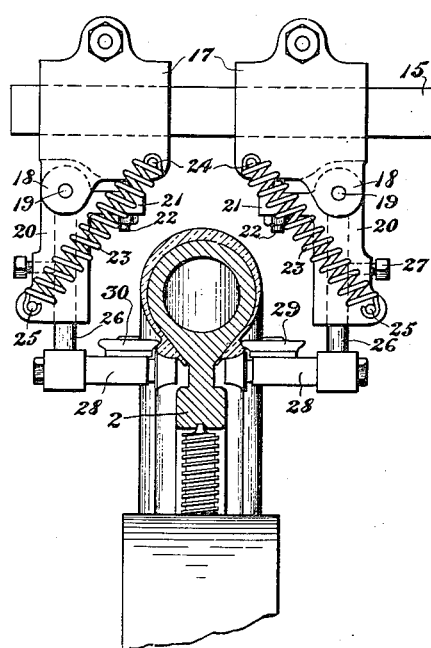
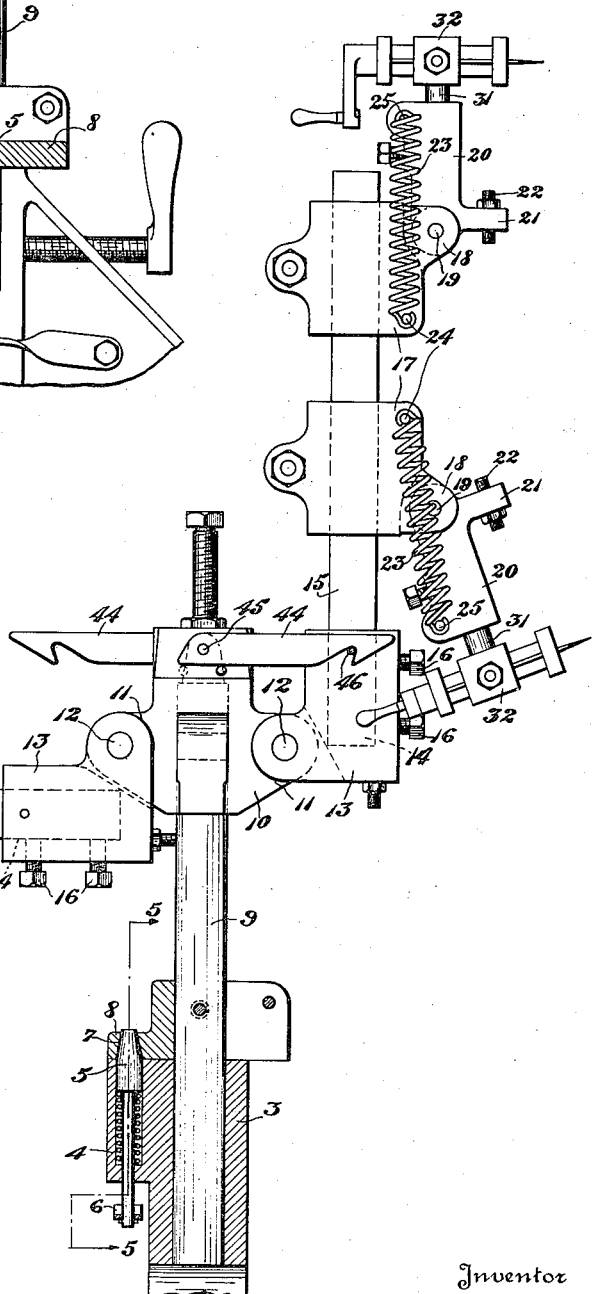
Inventor
Frank H. Grove
By Freass and Bond
Attorneys

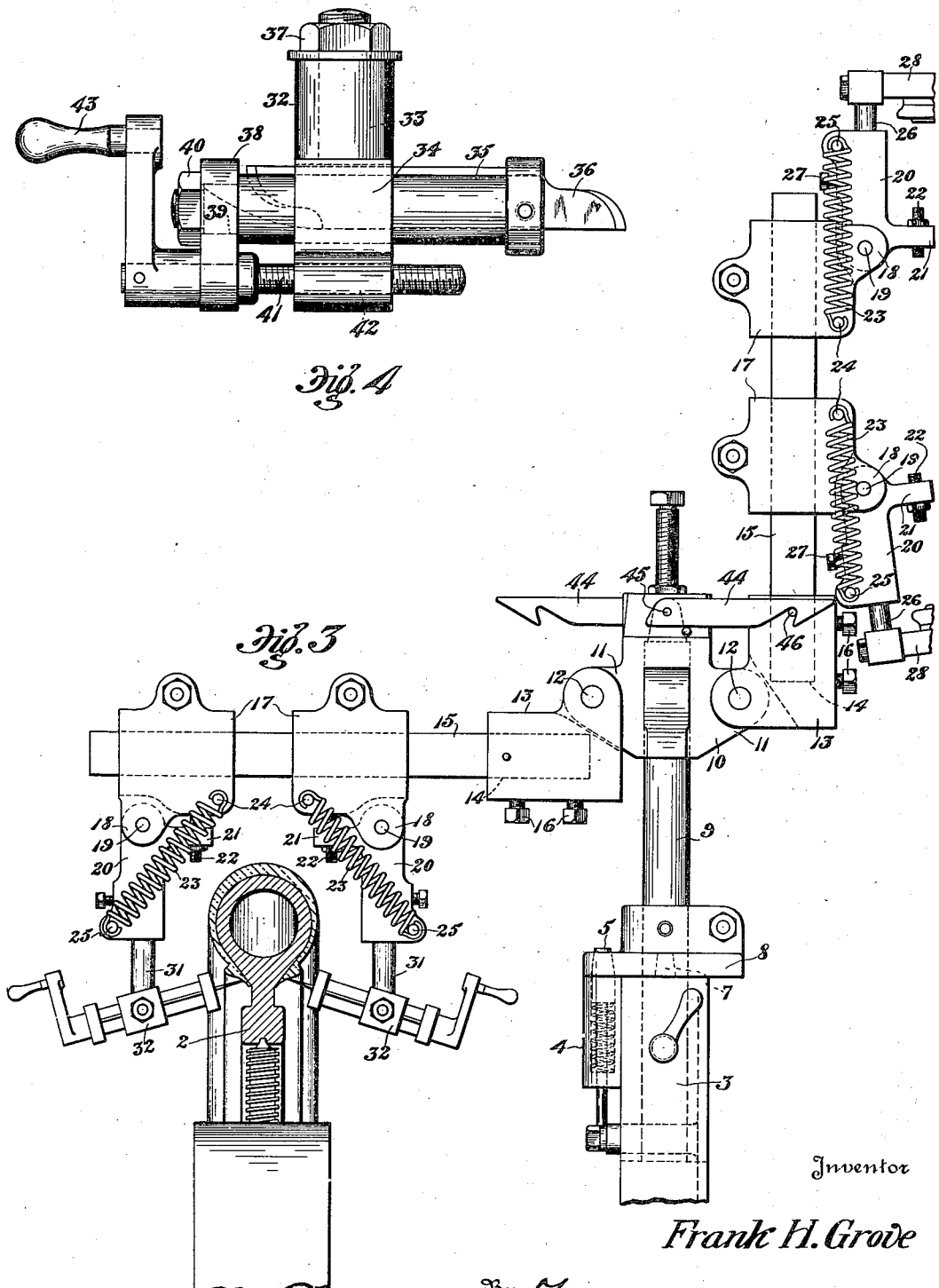

Patented Feb. 3, 1925.

1,524,861

UNITED STATES PATENT OFFICE.

FRANK H. GROVE, OF COLUMBIANA, OHIO.

TIRE-MAKING MACHINE.

Application filed March 13, 1922. Serial No. 543,447.

*To all whom it may concern:*

Be it known that I, FRANK H. GROVE, a citizen of the United States, residing at Columbiana, in the county of Columbiana and State of Ohio, have invented new and useful Improvements in Tire-Making Machines, of which the following is a specification.

This invention relates to tire building machines used for forming the outer casings of pneumatic tires and more particularly to a bead setting and trimming device which forms a part of this machine.

The objects of the invention are to provide a machine for building tire casings with a simple and efficient device arranged to co-operate with the rotary core upon which the tire casings are built, to set the beads upon the casings and trim the rough edges and surplus fabric from each casing before it is removed from the core.

The above and other objects may be attained by providing a revoluble vertical post upon the machine at one side of the rotary core, the bead setting and trimming devices being hinged upon the post and arranged to be normally held in a raised position, the post being arranged to be turned to bring either of the devices into instant engagement with the casing upon the rotary core.

A preferred embodiment of the invention thus set forth in general terms is illustrated in the accompanying drawings forming part hereof in which—

Figure 1 is an end elevation of a tire building machine embodying the invention;

Fig. 2, an elevation of the bead forming and trimming devices showing a portion of the core and tire casing in section, the bead setting rolls being shown in engagement with the casing.

Fig. 3, a similar view showing the trimming knives in engagement with the tire casing;

Fig. 4, a detail view of one of the trimming knives and operating mechanism; and Fig. 5, a section on the line 5—5, Fig. 2.

Similar numerals refer to similar parts throughout the drawings.

Referring to Fig. 1 of the drawings, the frame of a tire building machine, which may be of any usual and well known construction, is designated by the numeral 1, the rotatable core 2 being mounted thereon and arranged to receive the fabric strips from which the tire casing is built, in the usual manner.

The present invention relates more particularly to the bead setting and trimming devices which are mounted upon the frame 1 and arranged to be brought into position relative to the core 2 to set the beads upon the tire casing and to trim the surplus fabric from the casing which is being built upon said core.

A vertical bearing 3 is formed upon the frame adjacent to the core 2 and provided with a boss 4 at one side thereof in which is mounted a spring pressed plunger 5 arranged to be depressed by means of the lever 6 and adapted to enter either of the several apertures 7 provided in the collar 8 fixed upon the post 9 which is journaled in said bearing.

A head 10 is mounted upon the upper end of the post 9 and provided on opposite sides with the ears 11 to each of which is hingedly connected as at 12 a block 13 provided with a socket 14 within which one end portion of a rod 15 is secured as by the set screws 16.

A pair of collars 17 is adjustably mounted upon each of the rods 15, ears 18 being formed upon said collars to which are pivoted as at 19, tubular members 20, each of which is provided with an angular arm 21 upon which is threaded an adjustable stop 22 for engagement with the collars to limit the inward movement of said members.

Each of the tubular members 20 is arranged to be normally swung upon its pivot to hold the stop 22 thereof in engagement with the block 17 upon which the same is mounted, by means of the pull springs 23.

Each of these springs is connected at its opposite ends to the block and the member 20 as at 24 and 25 respectively, in such position that when the members 20 are drawn into the operative position, the springs will move over the pivotal center 19 thereof, holding the same in this position.

Rods 26 are located in one pair of tubular members 20, being fixedly mounted therein by means of the set screws 27. Each of these rods has an angular extension 28 carrying a pair of bead setting rolls 29 and 30.

Rods 31 are mounted in the other pair of tubular members 20 in the same manner, each of said rods having a head 32 which receives the reduced, threaded shank 33 of the guide block 34 through which is slidably mounted the arbor 35 carrying the trimming knife 36. A nut 37 is provided upon the shank 33 for adjusting the arbor at any desired angle.

A yoke 38 is mounted upon the reduced, rear extremity 39 of the arbor, being retained in position thereon by the nut 40, the screw 41 being journaled in said yoke and extending through the threaded bore 42 of the guide block, an operating crank 43 being fixed upon the rear end of the screw.

When the bead setting and trimming adjustments are not in use, the hinged rods 15 upon which said attachments are carried, are swung into the vertical position, as shown in Fig. 1, in which position they are held by means of the hooks 44 pivotally mounted upon the head 10, as at 45 and engaging the pins 46 provided for the purpose upon the blocks 13.

In this position, the members 20 carrying the bead setting rolls and the trimming knives are swung outward, being held in this position by means of the springs 23.

When it is desired to use either of the attachments, the lever 6 is depressed, moving the plunger 5 out of engagement with the collar 8, when the post 9 may be rotated to bring either the bead setting or trimming device into position adjacent to the core when the hook thereon is released, allowing the arm 15 to swing into a horizontal position above the core, as shown in Figs. 2 and 3.

The members 20 are then swung toward each other upon their pivots, the springs 23 pulling the same into the operative position, bringing the bead setting rolls or knives into engagement with the tire casing upon the core, as shown in Figs. 2 and 3 respectively.

From the above, it will be evident that a bead setting and trimming attachment is provided which may be normally held in the inoperative position to allow the tire casing to be built upon the rotary core without interference and which may be easily and quickly operated to bring either of the attachments into immediate use upon the tire casing when desired.

I claim:—

1. In combination with a rotatable tire building core, a bead setting and trimming device including a rotatable block mounted adjacent to the core and rotatable upon an axis at right angles to the axis of the core, a pair of arms hinged to the block, a bead setting attachment upon one arm, a trimming device upon the other arm, means for normally holding the arms in raised position, and means for swinging either arm into operative position above the core.

2. In combination with a rotatable tire building core, a bead setting and trimming device including a rotatable block mounted adjacent to the core and rotatable upon an axis at right angles to the axis of the core, a pair of arms hinged to the block, a pair of members pivotally mounted upon each arm, bead setting rolls upon the members on one arm, trimming knives upon the members on the other arm, means for urging the members of each pair toward each other, means for holding the members of each pair in inoperative position, means for holding the arms in raised position and means for swinging either arm into operative position above the core.

3. In combination with a rotatable tire building core, a bead setting and trimming device including a rotatable block mounted adjacent to the core and rotatable upon an axis at right angles to the axis of the core, a pair of arms hinged to the block, a pair of members pivotally mounted upon each arm, bead setting rolls upon one pair of said members, trimming knives upon the other pair of members, springs for urging each pair of members toward each other, means for holding the arms in raised position and means for swinging either arm into operative position above the core.

FRANK H. GROVE.